(12) United States Patent
Curtis et al.

(10) Patent No.: US 6,171,024 B1
(45) Date of Patent: Jan. 9, 2001

(54) INJECTION HOPPER FOR USE IN A MATERIAL DELIVERY SYSTEM

(75) Inventors: Don V. Curtis, Monroe; Edward J. Labus, Ann Arbor, both of MI (US)

(73) Assignee: J. A. Jones Environmental Services Company, Monroe, MI (US)

( * ) Notice: Under 35 U.S.C. 154(b), the term of this patent shall be extended for 0 days.

(21) Appl. No.: 09/099,254

(22) Filed: Jun. 18, 1998

Related U.S. Application Data

(60) Provisional application No. 60/050,189, filed on Jun. 19, 1997.

(51) Int. Cl.[7] .............................. B09B 1/00; G21F 9/00; E02D 5/18
(52) U.S. Cl. ......................... 405/128; 405/129; 405/258; 405/263
(58) Field of Search ................................. 405/128, 129, 405/182, 258, 303, 266, 267; 134/109, 111, 201, 132

(56) References Cited

U.S. PATENT DOCUMENTS

| | | | |
|---|---|---|---|
| 2,507,873 | * | 5/1950 | Ward .................................. 56/473.5 |
| 2,834,451 | * | 5/1958 | Turner ................................. 198/311 |

(List continued on next page.)

FOREIGN PATENT DOCUMENTS

WO 95/06401    3/1995    (WO) .

OTHER PUBLICATIONS

"The ENRECO Hydro Injection System"; Enreco Inc.; pp. 3–7; Published prior to Jun. 19, 1997.

"MecTool—A Revolutionary Patented System for In Situ Remediation"; Millgard Environmental Corporation; Entire Brochure; Published prior to Jun. 19, 1997.

"S.M.W. Cutoff Wall Technique for Containment of Hazardous Waste"; S.M.W.; Seiko, Inc.; pp. 10–11; Published prior to Jun. 19, 1997.

"Twin Header Blender—Toxic Waste Warrior"; Mitsui Machinery Distribution, Inc.; Entire Brochure; Published prior to Jun. 19, 1997.

"Slashbuster Excavator Mounted Stirring Attachment"; D & M Machine Division, Inc.; Entire Brochure; Published prior to Jun. 19, 1997.

"Technical Specifications for ITEX Heavy Duty In–Situ Mixing/Processing Equipment"; ITEX Environmental Services, Inc.; Entire Brochure; Published prior to Jun. 19, 1997.

* cited by examiner

*Primary Examiner*—Thomas B. Will
*Assistant Examiner*—Jong-Suk Lee
(74) *Attorney, Agent, or Firm*—Adams, Schwartz & Evans, P.A.

(57) ABSTRACT

A material injection hopper is adapted for mounting on a movable working arm of a self-propelled vehicle. The injection hopper is carried downwardly by the working arm into a waste storage lagoon to deliver waste-processing material to a predetermined subsurface target area in the lagoon. The injection hopper includes a hopper body including an inlet for receiving the material to be delivered to the lagoon, and an outlet downstream of the inlet for discharging the material. An auger conveyor is located within the hopper body and arranged between the inlet and the outlet for moving the material entering the hopper body downstream and outwardly through the outlet to the subsurface target area in the lagoon.

14 Claims, 9 Drawing Sheets

U.S. PATENT DOCUMENTS

| | | | |
|---|---|---|---|
| 3,888,196 | * 6/1975 | Glenn | 111/10 |
| 4,095,705 | * 6/1978 | Hood | 214/83.18 |
| 4,769,977 | 9/1988 | Milbourn . | |
| 4,906,142 | 3/1990 | Taki et al. . | |
| 4,940,187 | * 7/1990 | Lee | 241/79.1 |
| 5,013,185 | 5/1991 | Taki . | |
| 5,028,010 | 7/1991 | Sansing . | |
| 5,127,765 | 7/1992 | Millgard . | |
| 5,135,058 | 8/1992 | Millgard et al. . | |
| 5,242,246 | * 9/1993 | Manchak, III et al. | 405/128 |
| 5,256,001 | 10/1993 | Millgard . | |
| 5,265,977 | * 11/1993 | Weirich et al. | 405/128 |
| 5,353,998 | 10/1994 | Sansing . | |
| 5,361,708 | * 11/1994 | Barnes | 110/246 |
| 5,368,415 | 11/1994 | Kono et al. . | |
| 5,378,085 | 1/1995 | Kono et al. . | |
| 5,413,055 | * 5/1995 | Dern | 172/451 X |
| 5,417,522 | 5/1995 | Kono et al. . | |
| 5,443,352 | * 8/1995 | Schuhmacher | 414/526 |
| 5,631,160 | * 5/1997 | Bruso | 435/262.5 |
| 5,637,154 | * 6/1997 | Shorthouse | 134/25.1 |
| 5,678,639 | * 10/1997 | Golden | 172/52 |
| 5,692,689 | * 12/1997 | Shinn | 241/101.72 |
| 5,714,043 | * 2/1998 | Finley et al. | 202/262 |
| 5,765,966 | * 10/1996 | White et al. | 405/174 |
| 5,830,752 | * 8/1996 | Bruso | 435/283.1 |
| 5,913,638 | * 6/1999 | Lansdale | 405/179 |

INJECTION HOPPER FOR USE IN A MATERIAL DELIVERY SYSTEM

This application claim benefit to provisional application 60/050,189 filing date Jun. 19, 1997.

TECHNICAL FIELD AND BACKGROUND OF THE INVENTION

This invention relates to an injection hopper adapted for use in a material delivery system for the environmental treatment of solid, semisolid, and liquid waste. Such waste is commonly generated as a by-product of industrial plants, and then stored in man-made sludge lagoons for later processing. The delivery system conveys sludge-hardening reagent from a supply location at or above the sludge surface to a working location below the surface in the lagoon. A rotating mixer assembly blends the reagent and sludge together. The resulting mixture reacts causing the lagoon to harden sufficient for supporting trucks and other vehicles. After treatment, the solidified lagoon can be capped with a protective layer and used as a parking lot, equipment storage area, or the like.

According to one prior art waste treatment system, an industrial excavator including rotating tines 5–15 feet long is used for injecting and blending a reagent slurry below the surface into a waste lagoon. Unlike the present invention, this system is inapplicable for pneumatically conveying dry reagent from a supply location at or above the surface to a working location below the surface. Moreover, the prior art system does not include a reagent storage hopper attached directly to the stick of the excavator and adapted for being carried downwardly into the lagoon to treat the lagoon from the bottom up.

Other prior art waste treatment systems employ an excavator with a mixing assembly mounted on the stick and a remote reagent delivery source. These system are generally incapable of properly supplying and controlling reagent delivery to the specific target area being treated. Such problems typical result in treated areas having non-uniform hardness and consistency.

SUMMARY OF THE INVENTION

Therefore, it is an object of the invention to provide a reagent delivery system which injects a controlled amount of reagent below the surface directly to an area being treated.

It is another object of the invention to provide a reagent delivery system which results in treated areas of uniform hardness and consistency.

It is another object of the invention to provide a reagent delivery system which controls the release of reagent dust to the atmosphere during mixing.

It is another object of the invention to provide a reagent delivery system which is capable of conveying dry reagent from a supply location above the sludge surface to a working location below the sludge surface.

It is another object of the invention to provide a reagent delivery system which allows precise measurement and monitoring of reagent injected into the lagoon.

It is another object of the invention to provide a reagent delivery system which is computerized and programmable for automatic operation.

It is another object of the invention to provide a reagent delivery system which includes an alarm system for indicating operational breakdowns.

It is another object of the invention to provide a reagent delivery system which is operable in temperatures as cold as −30 degrees F.

It is another object of the invention to provide a reagent delivery system which is operable in other adverse whether conditions, such as heavy rain and snow.

It is another object of the invention to provide a reagent delivery system which uses portable equipment for allowing relocation of the system to other project sites.

It is another object of the invention to provide a reagent delivery system which monitors the amount of reagent delivered to a particular area and the total days of production.

It is another object of the invention to provide a reagent delivery system which includes instrumentation for indicating the reagent feed rate during mixing.

It is another object of the invention to provide a reagent delivery system which delivers a controlled amount of reagent to a precise target area below the surface of the sludge lagoon.

It is another object of the invention to provide a reagent delivery system which delivers reagent directly to an area proximate the rotating mixer drums.

These and other objects of the present invention are achieved in the preferred embodiments disclosed below by providing a material injection hopper adapted for mounting on a movable working arm of a self-propelled vehicle. The injection hopper is carried downwardly by the working aim into a waste storage lagoon to deliver waste-processing material to a predetermined subsurface target area in the lagoon. The injection hopper includes a hopper body defined by walls and including an inlet for receiving the material to be delivered to the lagoon, and an outlet downstream of the inlet for discharging the material. An auger conveyor is located within the hopper body and arranged between the inlet and the outlet for moving the material entering the hopper body downstream and outwardly through the outlet to the subsurface target area in the lagoon.

According to one preferred embodiment of the invention, a longitudinal injection chute is formed at the outlet of the hopper body for delivering the waste-processing material to the subsurface target area in the waste lagoon.

According to another preferred embodiment of the invention, the auger conveyor includes a longitudinal drive shaft and a helical conveyor blade. The conveyor blade extends within the injection chute for moving material in the hopper body outwardly through the outlet and into the waste lagoon.

According to yet another preferred embodiment of the invention, a second auger conveyor is located in the hopper body and extends generally perpendicular to the first auger conveyer for moving material in the hopper body laterally towards a mouth of the injection chute. The second auger conveyor includes a lateral drive shaft and a helical blade.

According to yet another preferred embodiment of the invention, the helical blade of the second auger conveyer includes a first blade segment extending in a helical path around the lateral drive shaft on one side of the first auger conveyer, and a spaced-apart second blade segment extending in an opposite helical path around the lateral drive shaft on an opposite side of the first auger conveyer. The material on each side of the first auger conveyer is moved towards the mouth of the injection chute.

According to yet another preferred embodiment of the invention, the injection chute is generally cylindrical.

According to yet another preferred embodiment of the invention, the length of the injection chute is greater than three times the diameter of the injection chute.

According to yet another preferred embodiment of the invention, a protective guard is attached to a free end of the injection chute to protect the end from damage as the working arm of the vehicle carries the injection hopper downwardly into the waste lagoon.

According to yet another preferred embodiment of the invention, a plurality of baffles extend longitudinally within the hopper body between the inlet and the outlet for dividing the body into separate compartments.

According to yet another preferred embodiment of the invention, the inlet of the hopper body includes an inlet tube extending laterally within the body and having a plurality of openings adjacent respective compartments for distributing material to each of the compartments.

In another embodiment, a material injection hopper is used in combination with a waste mixer mounted on a free end of a movable working arm of a self-propelled vehicle. The material injection hopper is attached to the working arm adjacent the waste mixer for being carried downwardly into a waste storage lagoon to deliver waste-processing material to a predetermined subsurface target area in the lagoon. The injection hopper includes a hopper body having an inlet for receiving the material to be delivered to the lagoon, and an outlet downstream of the inlet for discharging the material. An auger conveyor is located within the hopper body and arranged between the inlet and the outlet for moving the material entering the body downstream and outwardly through the outlet to the subsurface target area in the waste lagoon.

According another preferred embodiment of the invention, the waste mixer includes a pair of counter-rotating mixer drums.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
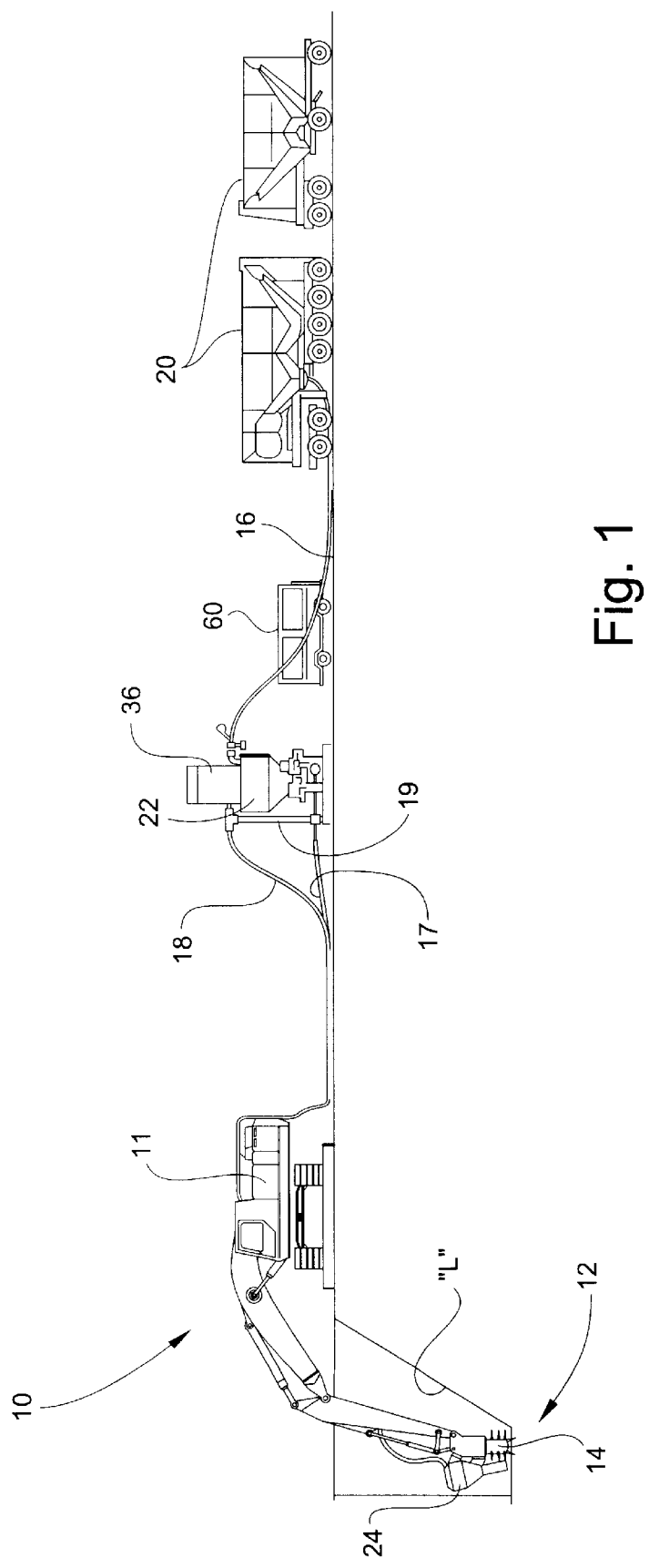
FIG. 1 is an environmental view of the injection hopper used in a reagent delivery system according to one preferred embodiment of the present invention.
Figure 2:
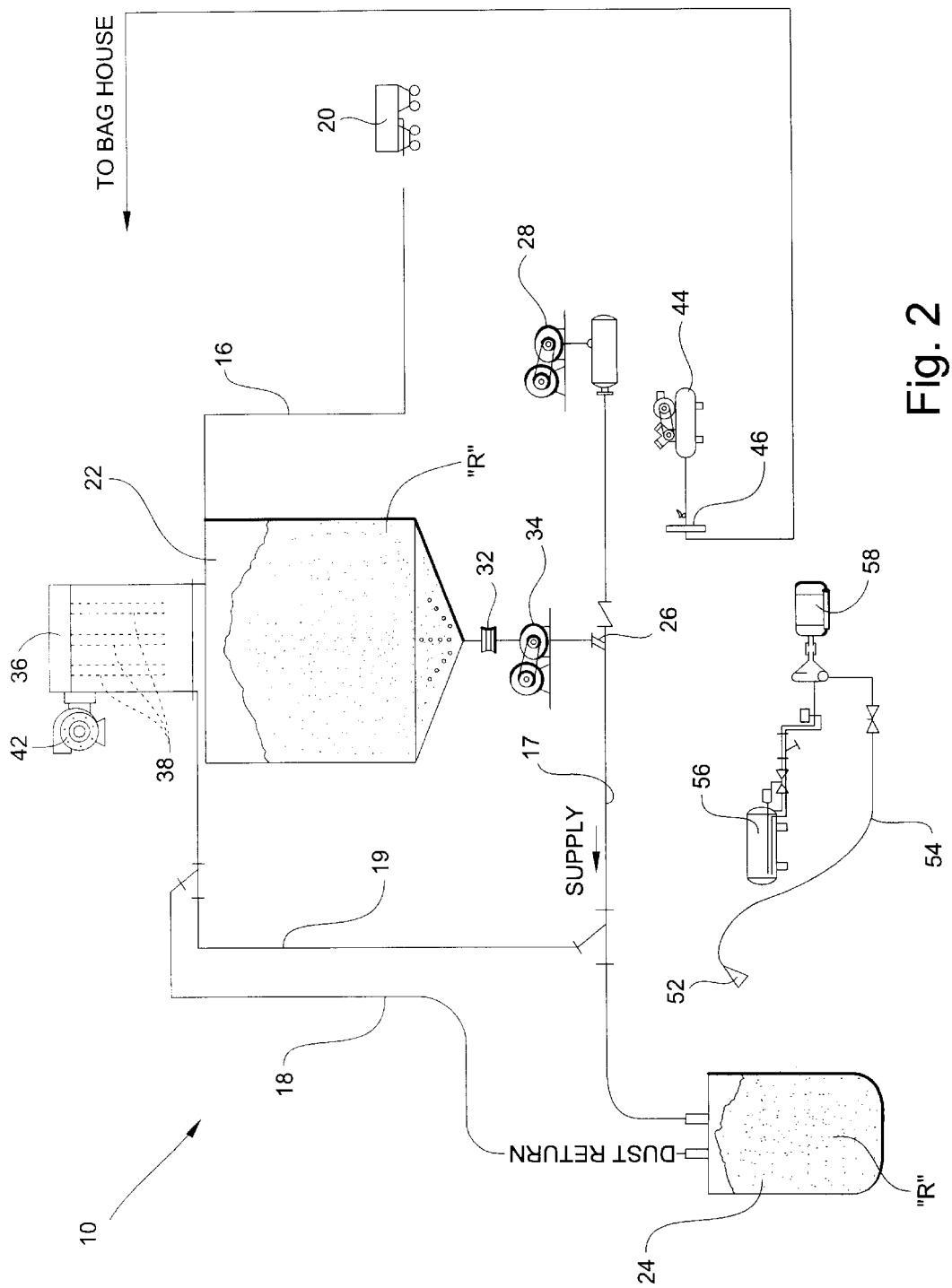
FIG. 2 is a schematic view of the reagent delivery system.

Referring now specifically to the drawings, a reagent delivery system according to the present invention is illustrated in FIGS. 1 and 2 and shown generally at reference numeral 10. The delivery system 10 employs a standard industrial excavator 11, such as the CAT 375L manufactured by Caterpillar, Inc. of Aurora, Ill., for delivering dry reagent below the surface of a sludge lagoon "L". The dry reagent is a mixture of cement and fly ash which reacts with the sludge waste to solidify the lagoon "L". The ratio of cement to fly ash is about 1:1 or 1:2 depending on the moisture content of the area to be treated. The excavator 11 includes direct reading pressure and flow gauges, a computerized depth/grade and slope recorder and indicator system, and has laser target and laser survey capabilities. The total length of the boom and stick of the excavator 11 is between 30–40 feet.

Figure 3:
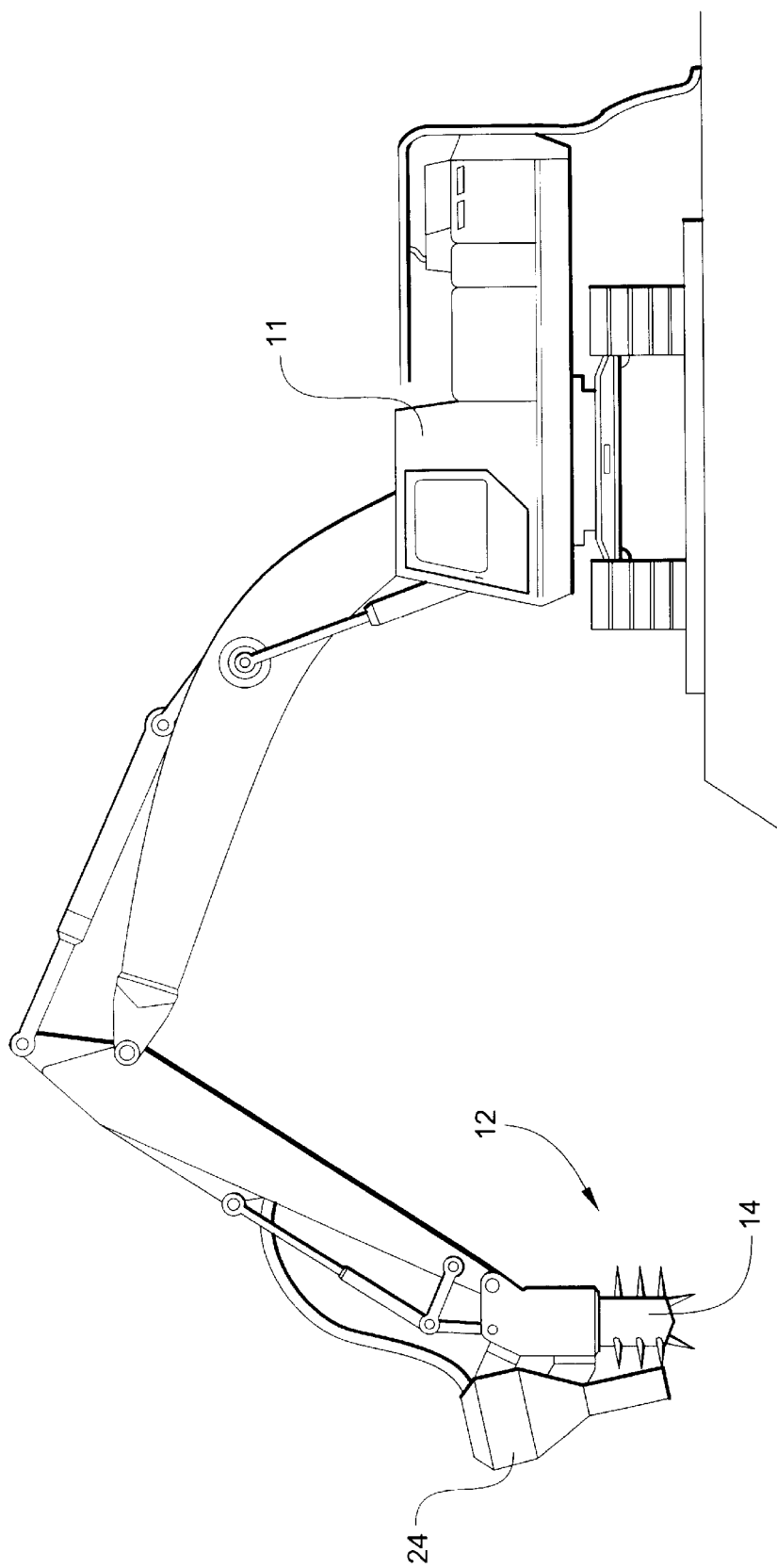
FIG. 3 is a side elevational view of the injection hopper mounted on the working arm of the excavator.

As best shown in FIG. 3, a mixer assembly 12 is pivotably mounted on the stick of the excavator 11 and includes a pair of spaced, axial, counter-rotating drums 14 which cooperate to mix the dry reagent with the sludge waste. A single lagoon "L", for example, may have a surface area of about 35 acres and a depth of 30 feet. The consistency of the sludge contained in the lagoon "L" ranges from liquid to solid. Once treated with reagent the entire lagoon "L" solidifies and is capable of supporting trucks and other industrial vehicles. The resulting load carrying capacity is preferably at least 25 psi. The cure time of the reagent/sludge mixture is approximately 7 to 21 days.

Referring to FIGS. 1 and 2, a number of 4-inch diameter hose lines 16, 17, 18, and 19 defining a closed pneumatic circuit convey reagent from delivery trailers 20 to a skid-mounted supply hopper 22 to an injection hopper 24 mounted on the stick of the excavator 11 adjacent the mixer drums 14. The excavator 11 carries the injection hopper 24 downward into the lagoon "L" where it augers dry reagent outwardly to a predetermined subsurface target area proximate the rotating mixer drums 14. The injection hopper 24 is sealed to store and contain the reagent below the sludge surface, keeping the reagent dry prior to its injection into the sludge. From the injection hopper 24, return air and any excess reagent is pneumatically conveyed back to the supply hopper 22 where the air is filtered and the reagent recycled. The injection hopper 24 is described in further detail below.

The delivery line 16 is connected at one end to the trailer 20 and at the opposite end to the supply hopper 22. A pneumatic blower (not shown) conveys reagent from the trailer 20 to the supply hopper 22. The supply line 17 is connected to a T-fitting 26 at an outlet formed in the bottom of the supply hopper 22, and communicates with a second pneumatic blower 28 mounted on the skid adjacent the supply hopper 22. A hopper valve 32 dispenses reagent from the supply hopper 22 to a rotary lock valve 34 which meters the amount of reagent passed to the T-fitting 26. The blower 28 charges the supply line 17 and conveys the reagent from the T-fitting 26 to the injection hopper 24 mounted on the stick of the excavator 11.

The return line 18 is connected at one end to the injection hopper 24 and at an opposite end to a bag house 36 mounted directly above an inlet to the supply hopper 22. The bag house 36 includes a number of vertically extending filter bags 38 which operate to capture reagent entrained in the air moving through the return line 18. The reagent collects on the filter bags 38 and falls back into the supply hopper 22. A blower 42 communicates with the bag house 36 to maintain negative air pressure on the filter bags 38. A compressor 44 and air dryer 46 supply purge air to the bag house 36, and cooperate to continuously dry and clean the filter bags 38 during operation of the delivery system 10. Filtered, clean air is exhausted from the bag house 36 to the atmosphere through an exhaust opening in the blower 42.

For added dust control, the delivery system 10 further includes a spray nozzle 52 attached to the boom of the excavator 11 and connected to a water line 54 extending to a water tank 56 mounted on the skid. The water spray nozzle 52 sprays water pumped by motor 58 from the water tank 56 and through the water line 54 to the excavator 11. The water spray controls the amount of surface dust generated by the delivery system 10 as reagent is pumped into the sludge lagoon "L".

The bypass line 19 is connected to the supply line 17 at one end downstream of the T-fitting 26 and at an opposite end to the return line 18 leading to the bag house 36. The by-pass line 19 is closed during delivery of reagent through the supply line 17 to the injection hopper 24. Delivery of reagent to the injection hopper 24 is stopped by opening the by-pass line 19 and closing the supply line 17 downstream of the connection of the by-pass line 19 to the supply line 17.

Operation of the reagent delivery system 10 is controlled by an operator at the supply hopper 22 or by a remote operator in the cab of the excavator 11. A generator 60 supplies the necessary electrical power to operate the system 10.

Description of Injection Hopper 24

Figure 4:
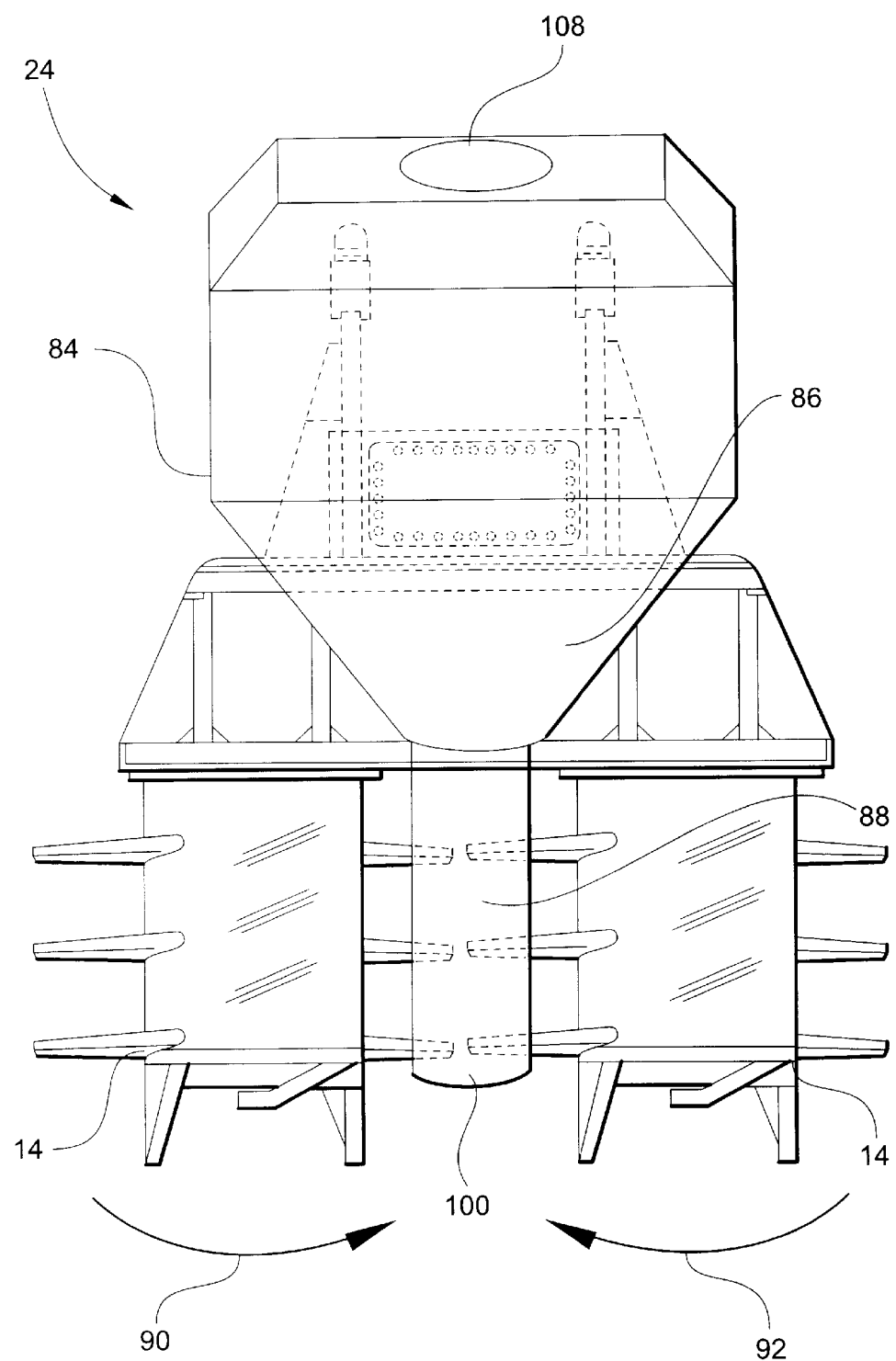
FIG. 4 is an enlarged, rear elevational view of the injection hopper and mixing drums.
Figure 5:
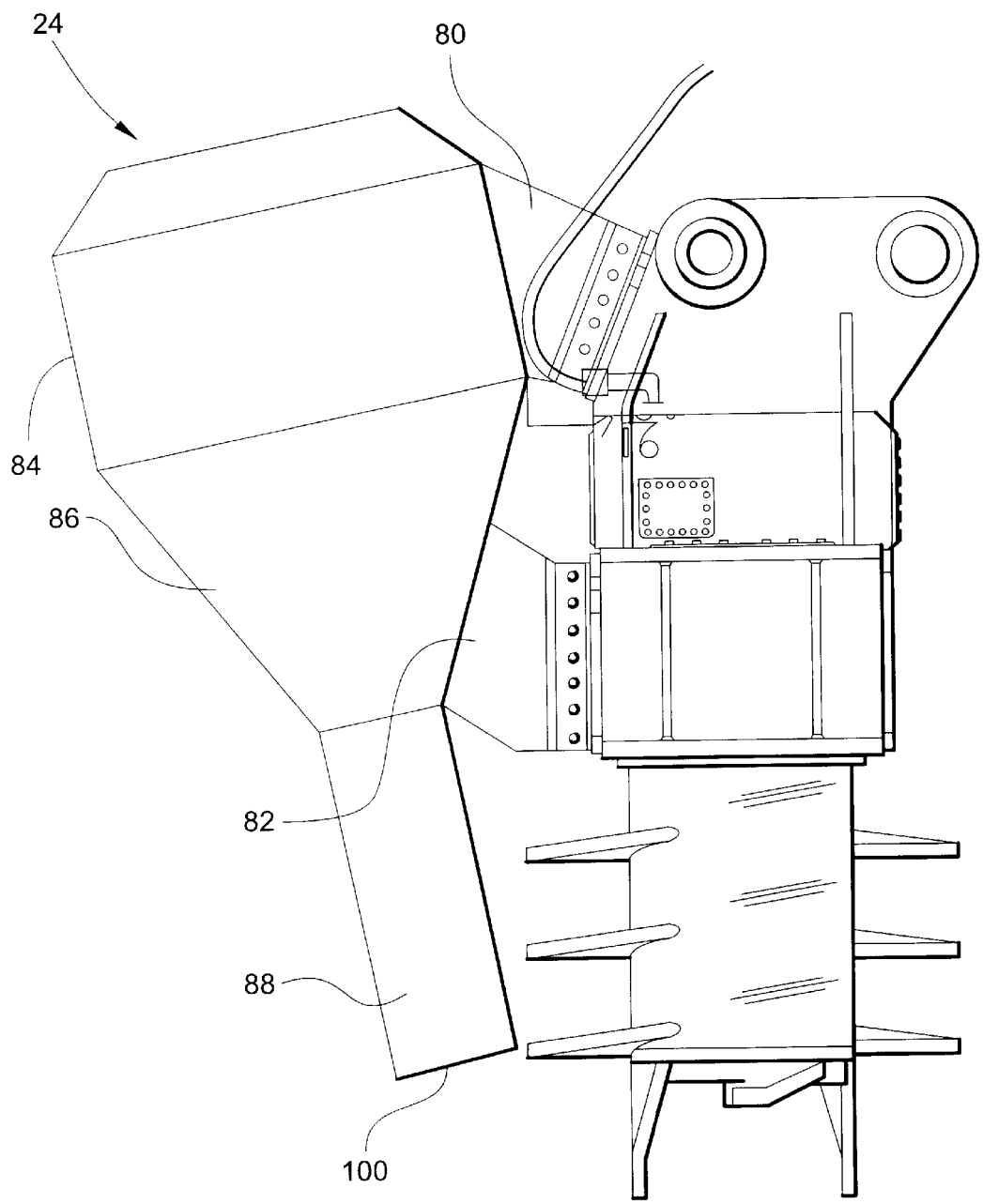
FIG. 5 is an enlarged, side elevational view of the injection hopper and mixing drums.

Referring to FIGS. 4 and 5, the injection hopper 24 is mounted adjacent the mixer drums 14 using brackets 80 and 82, and includes a hollow hopper body 84 with an inwardly tapered portion 86 and a cylindrical injection chute 88. The injection chute 88 extends to a point adjacent to and between the mixer drums 14 to ensure direct delivery of reagent to a predetermined subsurface target area in the sludge lagoon. As regent exits the injection chute 88 it is immediately blended with the sludge by the counter-rotating mixer drums 14. The direction of drum rotation is indicated in FIG. 5 by arrows 90 and 92. The controlled delivery of reagent to the subsurface target area and operation of the drums 14 result in treated areas having uniform hardness and consistency.

Figure 6:
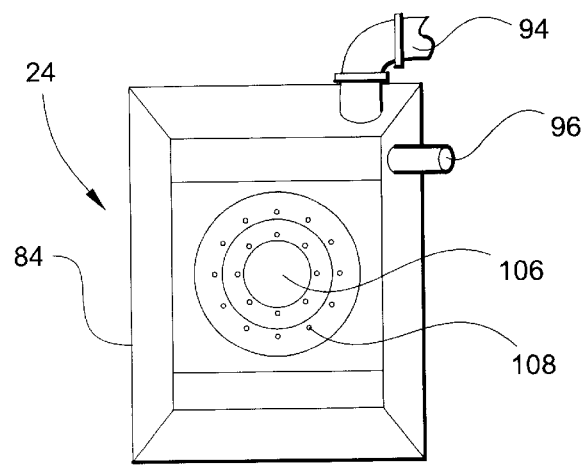
FIG. 6 is a top plan view of the injection hopper.
Figures 7, 8:
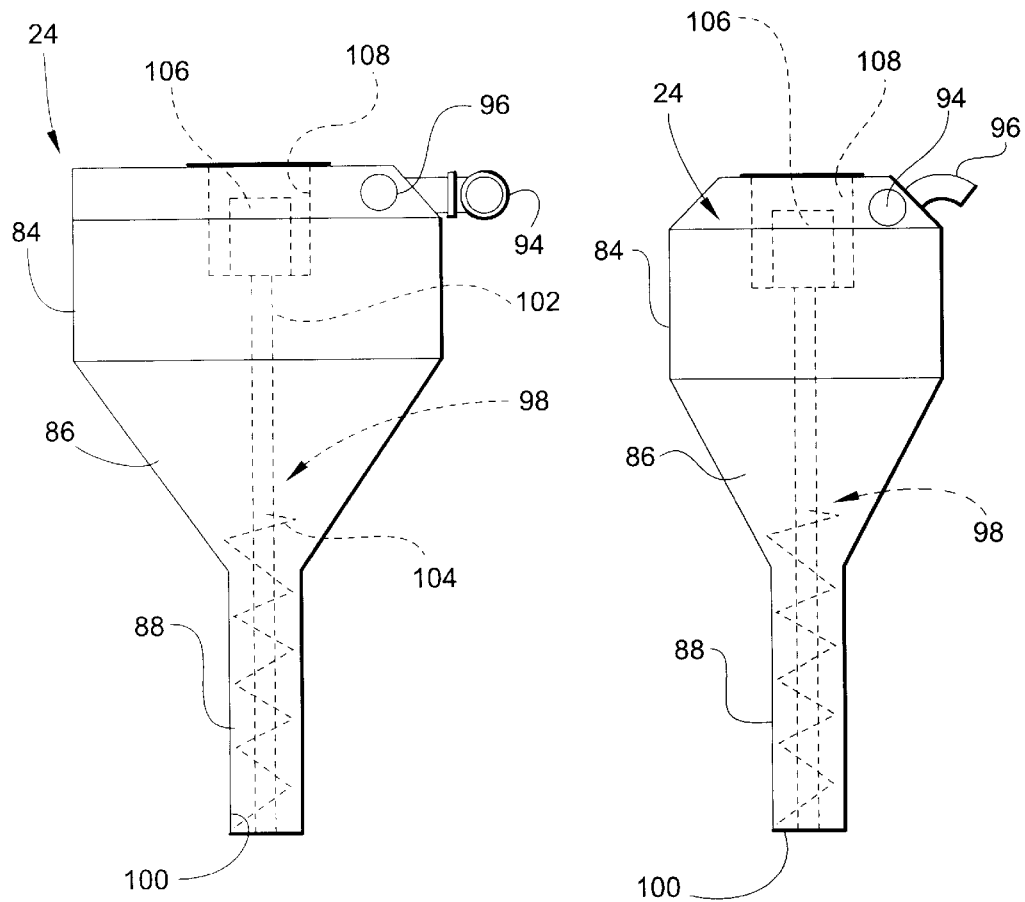
FIG. 7 is a front elevational view of the injection hopper with the auger conveyor shown in phantom.
FIG. 8 is a side elevational view of the injection hopper with the auger conveyor shown in phantom.

As shown in FIGS. 6–8, the injection hopper 88 has an supply connector 94 for connecting to the reagent supply line 17, and a return connector 96 for connecting to the return line 18. Reagent enters the body 84 of the injection hopper 24 through the supply connector 94 and is moved downstream by an auger conveyor 98 through an outlet 100 at an end of the injection chute 88 where the reagent exits to the sludge lagoon. Return air and any excess reagent is passed through the return line 18 back to the supply hopper 22, as previously described.

The auger conveyor 98 includes a longitudinal drive shaft 102 with a helical conveyor blade 104 and a motor 106 for actuating the drive shaft 102. The conveyor blade 104 extends from the mouth of the injection chute 88 to the outlet 100 with the edge of the blade 104 slightly spaced from the inside cylindrical wall of the injection chute 88. Rotation of the drive shaft 102 causes the conveyor blade 104 to pull reagent from the body 84 of the hopper 24 downwardly through the injection chute 88 and outwardly to the sludge lagoon.

The motor 106 resides in a cylindrical motor housing 108 formed in the top of the hopper body 84 opposite the injection chute 88. Preferably, the motor 106 is a model 1850 drive unit manufactured by McMillen Construction Equipment Attachments of Fort Wayne, Ind. The motor 106 has a maximum output speed of 30 gpm (gallons per minute) at 104 rpm. The maximum output torque at 3000 psi is 2641 ft/lbs.

Figure 9:
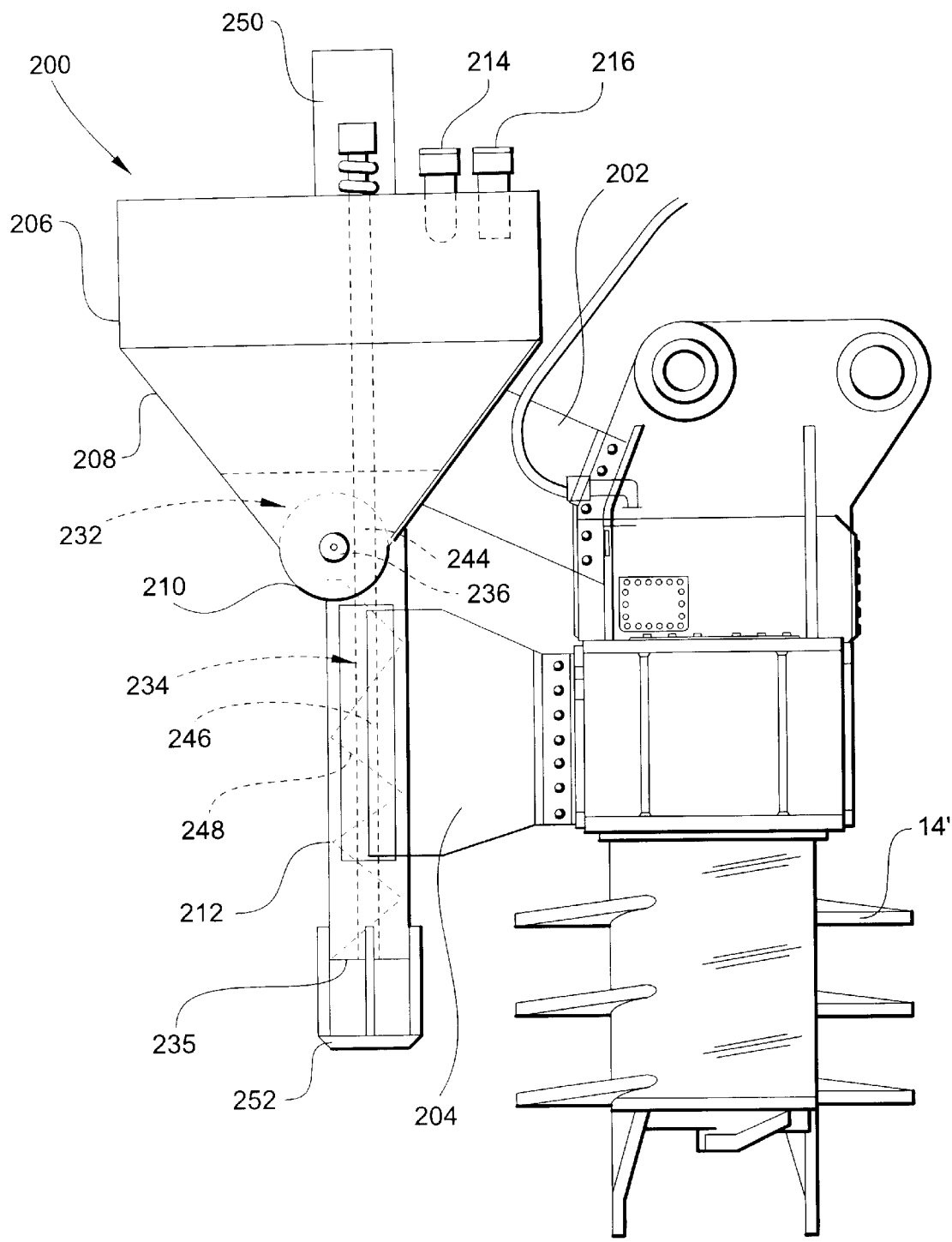
FIG. 9 is a side elevational view of the injection hopper according to a second preferred embodiment of the invention as mounted adjacent the mixing drums, and showing the auger conveyers in phantom.
Figure 10:
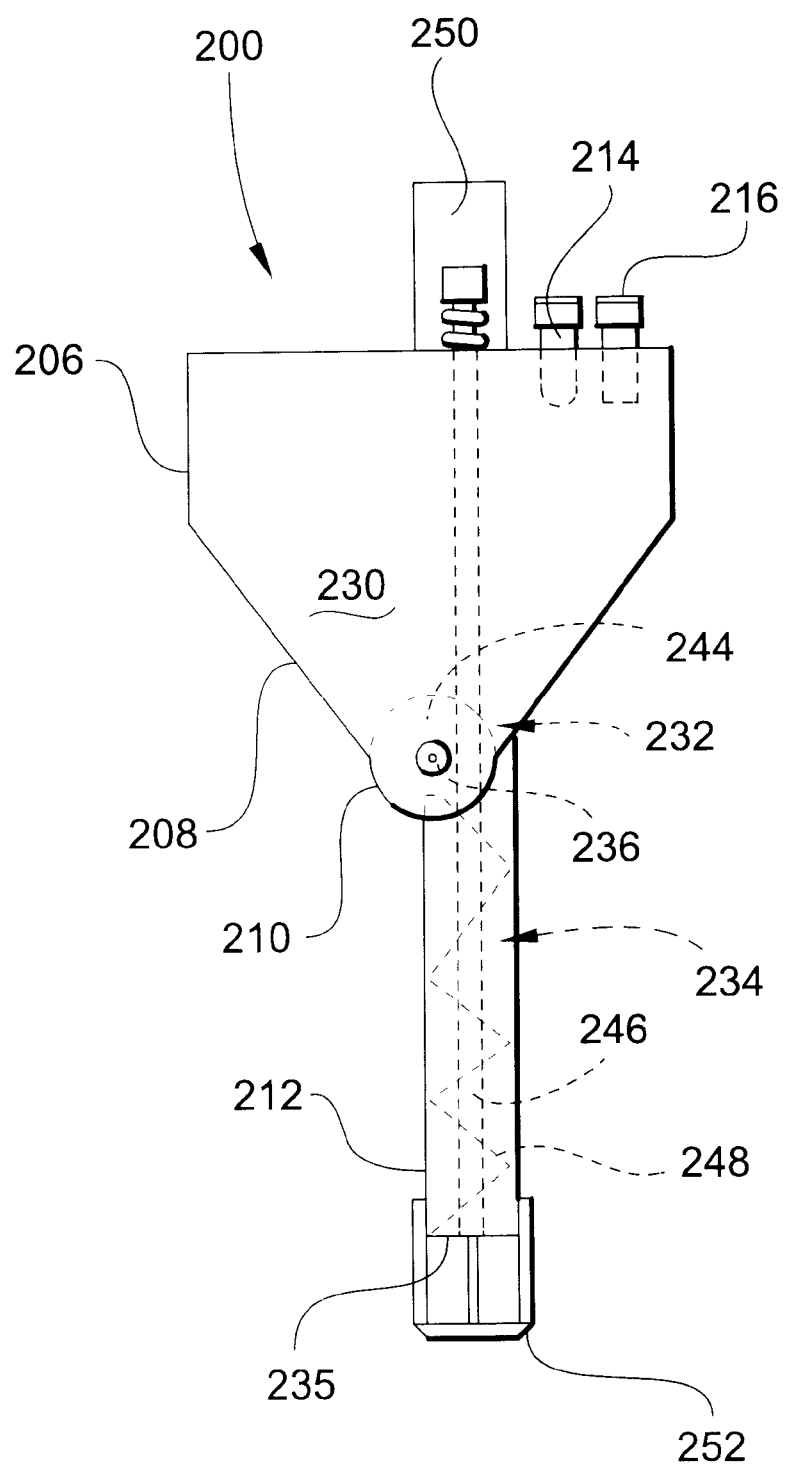
FIG. 10 is a side elevational view of the injection hopper with the auger conveyers shown in phantom.
Figure 11:
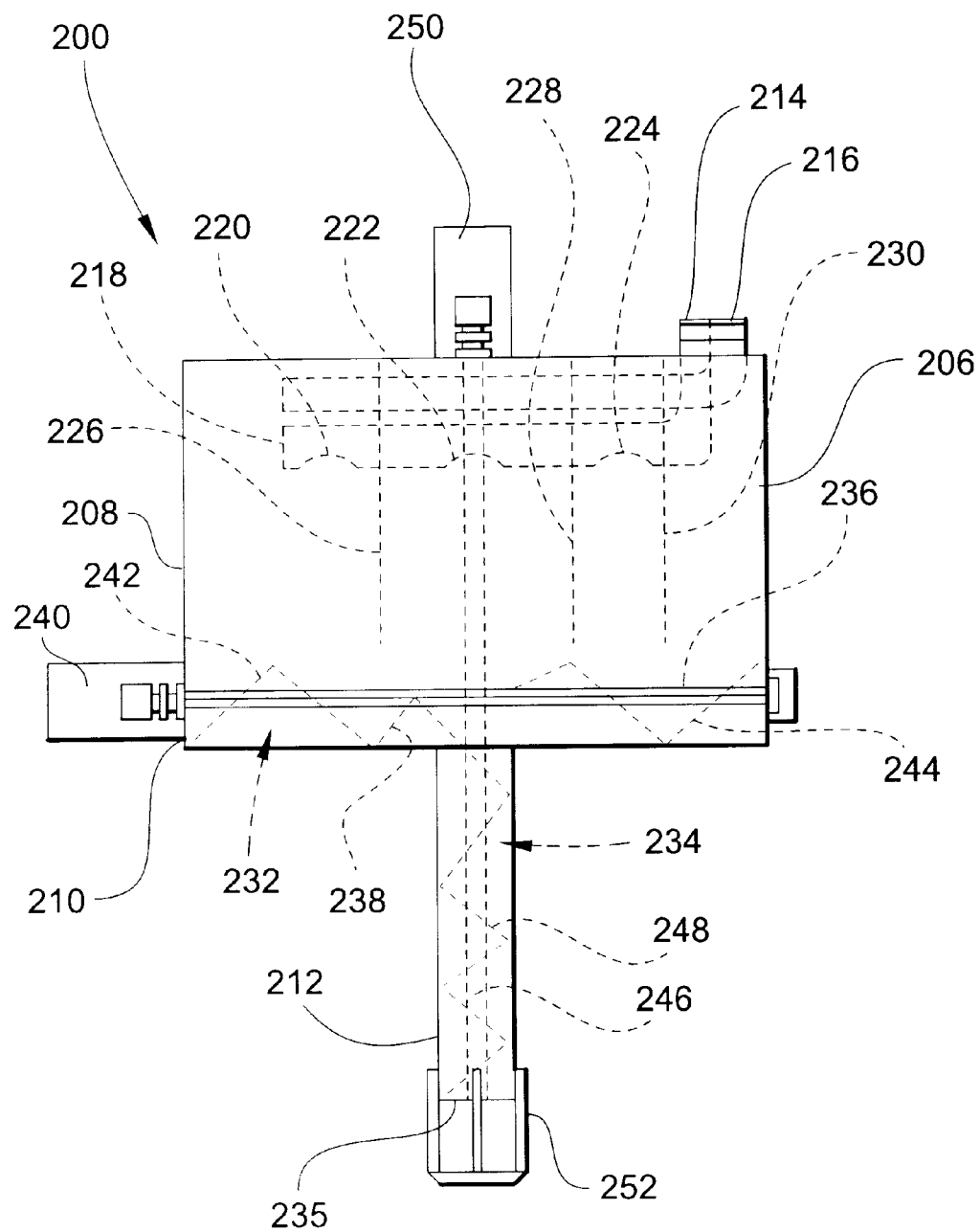
FIG. 11 is a front elevational view of the injection hopper with the auger conveyers shown in phantom.

A second embodiment of an injection hopper 200 according to the invention is shown in FIGS. 9–11. As described above, the injection hopper 200 is mounted adjacent the mixer drums 14' (only one shown) using brackets 202 and 204, and includes a hollow hopper body 206 with an inwardly tapered portion 208 defining a lateral channel 210 and a cylindrical injection chute 212 depending from the channel 210. The injection chute 212 extends to a point adjacent to and between the mixer drums 14' to ensure direct delivery of reagent to a predetermined subsurface target area in the sludge lagoon.

The injection hopper 200 has a supply connector 214 for connecting to the reagent supply line 17, and a return connector 216 for connecting to the return line 18. Reagent enters the body 206 of the hopper 200 through the supply connector 214 and is moved downstream through a lateral inlet tube 218 with spaced openings 220, 222, and 224 for distributing the reagent into separate compartments defined by longitudinal baffles 226, 228, and 230. A lateral auger conveyor 232 is located in the interior channel 210 of the hopper body 206 and extends across the mouth of the injection chute 212 at the bottom of the baffles 226, 228, and 230. The lateral auger conveyor 232 cooperates with a centrally-disposed longitudinal auger conveyer 234 to move reagent towards the center of the hopper body 206 and through the injection chute 212 and outlet 235 to the sludge lagoon.

The lateral auger conveyor 232 includes a lateral drive shaft 236 with a helical conveyor blade 238 and a motor 240 for actuating the drive shaft 236. A first blade segment 242 extends in a helical path around the drive shaft 236 on one side of the longitudinal auger conveyer 234, and a spaced-apart second blade segment 244 extends in an opposite helical path around the drive shaft 236 on an opposite side of the longitudinal auger conveyer 234. The blade segments 242 and 244 cooperate upon rotation of the lateral drive shaft 236 to move reagent towards the mouth of the injection chute 212 where the reagent is then pulled by the longitudinal auger conveyer 234 through the injection chute 212 and outwardly to the sludge lagoon. The longitudinal auger conveyer 234 includes a longitudinal drive shaft 246 with a helical conveyor blade 248 and a motor 250 for actuating the drive shaft 246.

The motors 240 and 250 are preferably identical to that described above. An alternative commercially available motor is that manufactured by Eaton Corporation of Hamilton, Ind., and sold as CHAR LYNN 6000 Series, Product #112-1068, M06 30 BO1A 0000E. This motor has a maximum displacement of about 30 gpm and a maximum power of about 70 hp.

According to one embodiment, the length of the injection chute 212 is about 3'6" and the diameter of the outlet 235 about 10". In addition, a protective metal guard 252 may be applied to the free end of the chute 212 to protect the outlet 235 from damage as the injection hopper 200 is carried downwardly into the sludge lagoon.

An injection hopper for a material delivery system is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A material injection hopper adapted for mounting on a movable working arm of a self-propelled vehicle, and for being carried downwardly by the working arm into a waste storage lagoon to deliver waste-processing material to a predetermined subsurface target area in the lagoon, said injection hopper comprising:

(a) a hopper body having an inlet for receiving the material to be delivered to the lagoon, and an outlet downstream of said inlet for discharging the material, said hopper body comprising a longitudinal injection chute formed at said outlet thereof, and a plurality of baffles extending longitudinally within said hopper body between said inlet and said outlet thereof for dividing said hopper body into separate compartments;

(b) an auger conveyor extending within the injection chute of said hopper body and arranged between said inlet and said outlet, and cooperating with the injection chute of said hopper body for moving the material entering said body downstream and outwardly through said outlet to the subsurface target area in the lagoon; and (c) a protective guard attached to a free end of said injection chute to protect the end from damage as the working arm of the vehicle carries the injection hopper downwardly into and through the waste lagoon.

2. An injection hopper according to claim 1, wherein said auger conveyor comprises a longitudinal drive shaft and a helical conveyor blade extending within said injection chute for moving the material in said hopper body outwardly through said outlet and into the waste lagoon.

3. An injection hopper according to claim 2, and comprising a second auger conveyor located in said hopper body and extending generally perpendicular to said first auger conveyer for moving material in said body laterally towards a mouth of said injection chute, and said second auger conveyor comprising a lateral drive shaft and a helical blade.

4. An injection hopper according to claim 3, wherein the helical blade of said second auger conveyer includes a first blade segment extending in a helical path around the lateral drive shaft on one side of said first auger conveyor, and a spaced-apart second blade segment extending in an opposite helical path around the lateral drive shaft on an opposite side of said first auger conveyor, such that the material on each side of said first auger conveyor is moved towards the mouth of said injection chute.

5. An injection hopper according to claim 1, wherein said injection chute is generally cylindrical.

6. An injection hopper according to claim 5, wherein the length of said injection chute is greater than three times the diameter of said injection chute.

7. An injection hopper according to claim 1, wherein the inlet of said hopper body comprises an inlet tube extending laterally within said body and having a plurality of openings adjacent respective compartments for apportioning the material to each of said compartments.

8. A material injection hopper adapted for mounting on a movable working arm of a self-propelled vehicle, and for being carried downwardly by the working arm into a waste storage lagoon to deliver waste-processing material to a predetermined subsurface target area in the lagoon, said injection hopper comprising:

(a) a hopper body having an inlet for receiving the material to be delivered to the lagoon, and an outlet downstream of said inlet, and a plurality of baffles extending longitudinally within said hopper body between said inlet and said outlet thereof for dividing said hopper body into separate compartments;

(b) a longitudinal injection chute formed at the outlet of said hopper body for delivering the material to a predetermined subsurface target area in the waste lagoon, the length of said injection chute being at least three times the diameter of said injection chute;

(c) an auger conveyor located within said hopper body and arranged between said inlet and said outlet for moving the material entering said body downstream and outwardly through said injection chute to the subsurface target area in the waste lagoon; and (d) a protective guard attached to a free end of said injection chute to protect the end from damage as the working arm of the vehicle carries the injection hopper downwardly into and through the waste lagoon.

9. In combination with a waste mixer mounted on a free end of a movable and extendable working arm of a self-propelled vehicle, a material injection hopper attached to the working arm adjacent the waste mixer for being carried downwardly into and through a waste storage lagoon upon downward movement and extension of the working arm, said injection hopper comprising:

(a) a hopper body having an inlet for receiving a waste-processing material to be delivered to the lagoon, and an outlet downstream of said inlet, said hopper body comprising a longitudinal injection chute formed at said outlet thereof for discharging the waste-processing material to an area adjacent the waste mixer; and (b) an auger conveyor extending within the injection chute of said hopper body and arranged between said inlet and said outlet, and cooperating with the injection chute of said hopper body for moving the waste-processing material entering said hopper body downstream and outwardly through said outlet, said auger conveyor permitting direct and controlled delivery of the waste-processing material from the injection chute to the area adjacent the waste mixer for immediate blending with the waste in a predetermined subsurface target area in the lagoon, such that the treated areas of the lagoon result in uniform hardness and consistency.

10. A combination according to claim 9, wherein said hopper body comprises a longitudinal injection chute formed at said outlet for delivering the waste-processing material to the target area in the waste lagoon.

11. A combination according to claim 10, wherein said auger conveyor comprises a longitudinal drive shaft and a helical conveyor blade extending within said injection chute for moving material in said hopper body outwardly through said outlet and into the waste lagoon.

12. A combination according to claim 11, and comprising a second auger conveyor located in said hopper body and extending generally perpendicular to said first auger conveyer for moving material in said hopper body laterally towards a mouth of said injection chute, and said second auger conveyor comprising a lateral drive shaft and a helical blade.

13. A combination according to claim 12, wherein the helical blade of said second auger conveyer includes a first blade segment extending in a helical path around the lateral drive shaft on one side of said first auger conveyor, and a spaced-apart second blade segment extending in an opposite helical path around the lateral drive shaft on an opposite side of said first auger conveyer, such that material on each side of said first auger conveyer is moved towards the mouth of said injection chute.

14. A combination according to claim 9, wherein said waste mixer comprises a pair of counter-rotating mixer drums.

* * * * *